United States Patent
Son

(10) Patent No.: US 11,207,785 B2
(45) Date of Patent: Dec. 28, 2021

(54) TOOL CHANGER AND TOOL CHANGE SYSTEM

(71) Applicant: LG ELECTRONICS INC., Seoul (KR)

(72) Inventor: Changwoo Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 16/787,646

(22) Filed: Feb. 11, 2020

(65) Prior Publication Data

US 2021/0078121 A1   Mar. 18, 2021

(30) Foreign Application Priority Data

Sep. 16, 2019   (KR) ......................... 10-2019-0113715

(51) Int. Cl.
*B25J 15/04*   (2006.01)
*B23B 31/28*   (2006.01)

(52) U.S. Cl.
CPC ........... *B25J 15/0441* (2013.01); *B23B 31/28* (2013.01)

(58) Field of Classification Search
CPC .... B25J 15/04; B25J 15/0491; B25J 15/0441; B25J 15/0475; B23Q 7/1431; B23B 31/28
USPC ...................................................... 279/128
See application file for complete search history.

(56) References Cited

U.S. PATENT DOCUMENTS

| | | | | | |
|---|---|---|---|---|---|
| 1,555,877 | A | * | 10/1925 | Ripberger | B23B 31/28 335/289 |
| 1,816,888 | A | * | 8/1931 | Arter | B23Q 3/1543 335/290 |
| 2,812,185 | A | * | 11/1957 | Snell | B23B 31/28 279/128 |
| 2,835,148 | A | * | 5/1958 | Buck | B23Q 3/1543 269/8 |
| 4,145,802 | A | * | 3/1979 | d'Auria | B23Q 3/15506 483/32 |
| 4,310,958 | A | * | 1/1982 | Balaud | B23K 11/318 219/125.1 |
| 4,488,241 | A | * | 12/1984 | Hutchins | B25J 9/1612 279/900 |
| 4,635,328 | A | * | 1/1987 | Palmer | B25J 19/063 29/26 A |
| 5,372,567 | A | * | 12/1994 | Whittington | B23Q 1/0009 219/86.8 |
| 5,779,609 | A | * | 7/1998 | Cullen | B23K 9/287 219/98 |

(Continued)

FOREIGN PATENT DOCUMENTS

GB   2581847 A  *  9/2020  .......... B25J 17/0225

*Primary Examiner* — Jason L Vaughan
(74) *Attorney, Agent, or Firm* — Birch, Stewart, Kolasch & Birch, LLP

(57) ABSTRACT

A tool changer is included in a manipulator of a robot and selectively fastens to a tool by a magnetic force. The tool changer may include a housing; an inner core embedded in the housing; a coil wound around the inner core, wherein a current is applied to the coil; a pair of connecting cores connected to both ends of the inner core, protruding from the housing to the tool, and inserted into a connecting groove of the tool; a switch configured to regulate the current applied to the coil; and a controller configured to open or close the switch according to a set frequency.

18 Claims, 9 Drawing Sheets

(56) References Cited

U.S. PATENT DOCUMENTS

| | | | | |
|---|---|---|---|---|
| 5,993,365 A * | 11/1999 | Stagnitto | ............. | B25J 15/0491 |
| | | | | 414/736 |
| 8,858,411 B2 * | 10/2014 | Mossi | .................... | B21D 43/11 |
| | | | | 483/15 |
| 9,440,360 B2 * | 9/2016 | Heinrich | ............. | B23Q 1/0018 |
| 9,975,253 B2 * | 5/2018 | De Castelbajac | .... | B25J 15/0475 |
| 10,335,957 B2 * | 7/2019 | Zachary | ............... | B25J 15/0416 |

* cited by examiner

TOOL CHANGER AND TOOL CHANGE SYSTEM

CROSS-REFERENCE TO RELATED APPLICATION

The present application claims priority under 35 U.S.C. 119 to Korean Patent Application No. 10-2019-0113715, filed on Sep. 16, 2019, which is hereby incorporated by reference in its entirety.

BACKGROUND

The present disclosure relates to a tool changer for changing a tool and a tool change system including the same.

In general, a mechanism that performs exercise looking like a human motion by using an electrical or magnetic action is named a robot. Recently, robots are being utilized in a variety of fields due to development in control technology, and, for example, may include surgical robots, housekeeping robots, service robots, space-air remote robots, dangerous substance treating robots and so forth. Such robots perform tasks by using a manipulator made to exercise close to motions of arms or hands by an electrical/mechanical mechanism.

In particular, housekeeping robots can perform specific tasks by fastening a specific tool to the manipulator. As an example, cooking robots can perform cooking by fastening a variety of tools such as a ladle, tongs, a pot and the like, to the manipulator.

Thus, for improvement of work performance efficiency, it is important for a tool changer included in the manipulator to rapidly and exactly change the tool.

However, since conventional tool changers use a pneumatic system, they require a big structure and subsidiary equipment, and thus many expenses are incurred and noises take place.

SUMMARY

One technical problem to be solved by the present disclosure is intended to provide a tool changer which can rapidly and conveniently bind/separate a tool and a tool change system including the same.

The other technical problem to be solved by the present disclosure is intended to provide a tool change system which can vibrate a tool by changing a binding force between the tool and the tool changer.

A tool changer according to an embodiment of the present disclosure is included in a manipulator of a robot and may be selectively fastened to a tool by a magnetic force. The tool changer may comprise: a housing; an inner core embedded in the housing; a coil wound around the inner core, wherein a current is applied to the coil; a pair of connecting cores connected to both ends of the inner core, protruding from the housing to the tool, and inserted into a connecting groove of the tool; a switch configured to regulate the current applied to the coil; and a controller configured to open or close the switch according to a set frequency.

A cross-section area of the connecting core may be smaller than an inner cross-section area of the connecting groove.

The connecting core may protrude in a horizontal direction from the housing, or slopingly protrude in a direction that as the connecting core moves away from the housing, a height thereof gets higher.

The connecting core may comprise: an inner part disposed in the housing and having a first length; and an outer part extending from the inner part, disposed outside the housing, and having a second length longer than the first length.

A tool changer according to another embodiment of the present disclosure is included in a manipulator of a robot and may be selectively fastened to a tool by a magnetic force. The tool changer may comprise: a housing; an inner core embedded in the housing; a coil wound around the inner core, wherein a current is applied to the coil; a pair of magnets connected to both ends of the inner core, protruding from the housing to the tool, and inserted into a connecting groove of the tool; a switch configured to regulate the current applied to the coil; and a controller configured to open or close the switch according to a set frequency.

S pole of one magnet of the pair of magnets may be in contact with the inner core, and N pole of the one magnet may protrude outside of the housing, and N pole of the other magnet of the pair of magnets may be in contact with the inner core, and S pole of the other magnet may protrude outside of the housing.

A cross-section area of the magnet may be smaller than an inner cross-section area of the connecting groove.

The magnet may protrude in a horizontal direction from the housing, or slopingly protrude in a direction that as the magnet moves away from the housing, a height thereof gets higher.

The magnet may comprise: an inner part disposed in the housing and having a first length; and an outer part extending from the inner part, disposed outside the housing, and having a second length longer than the first length.

The set frequency may be consistent with a resonance frequency of the tool.

The tool change system according to the present disclosure may comprise: a tool; and a tool changer included in a manipulator of a robot and selectively fastened to the tool by a magnetic force.

The tool changer may comprise: a housing; an inner core embedded in the housing; a coil wound around the inner core, wherein a current is applied to the coil; a pair of connecting cores connected to both ends of the inner core and protruding from the housing to the tool; a switch configured to regulate the current applied to the coil; and a controller configured to open or close the switch according to a set frequency.

The tool may comprise: a tool body; and a coupler fastened to the tool body, including a magnetic body on which the magnetic force is exerted, and forming a connecting groove into which the connecting core is inserted.

A cross-section area of the connecting core is smaller than an inner cross-section area of the connecting groove.

The connecting core may protrude in a horizontal direction from the housing, or slopingly protrude in a direction that as the connecting core moves away from the housing, a height thereof gets higher.

The connecting core may comprise: an inner part disposed in the housing and having a first length; and an outer part extending from the inner part, disposed outside the housing, and having a second length longer than the first length.

The set frequency may be consistent with a resonance frequency of the tool.

DETAILED DESCRIPTION OF THE EMBODIMENTS

Figure 1:
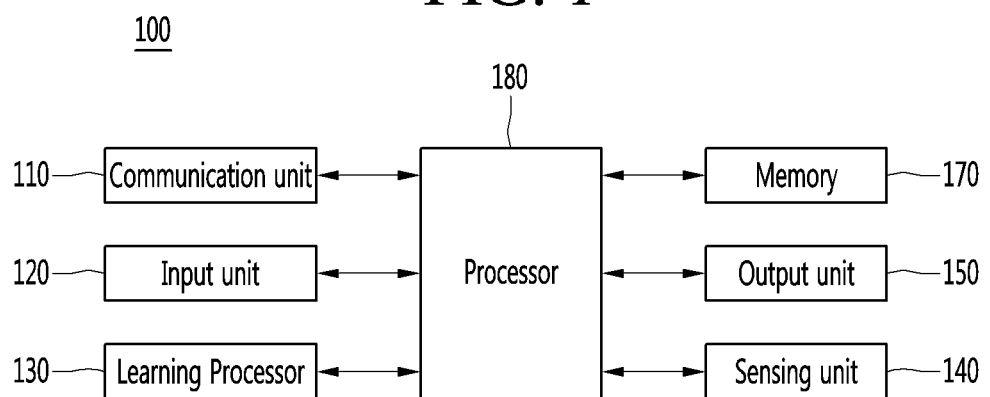
FIG. 1 illustrates an AI device 100 including a robot according to an embodiment of the present disclosure.

Hereinafter, detailed embodiments will be described in detail with reference to the accompanying drawings of the present disclosure.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
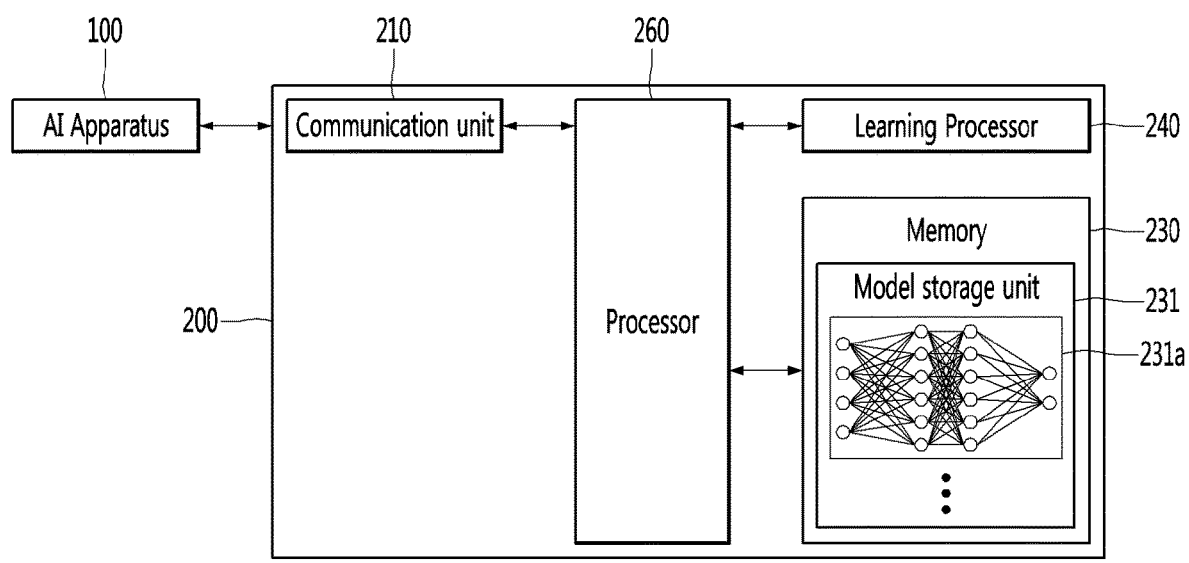
FIG. 2 illustrates an AI server 200 connected to a robot according to an embodiment of the present disclosure.

FIG. 2 illustrates an AI server 200 connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
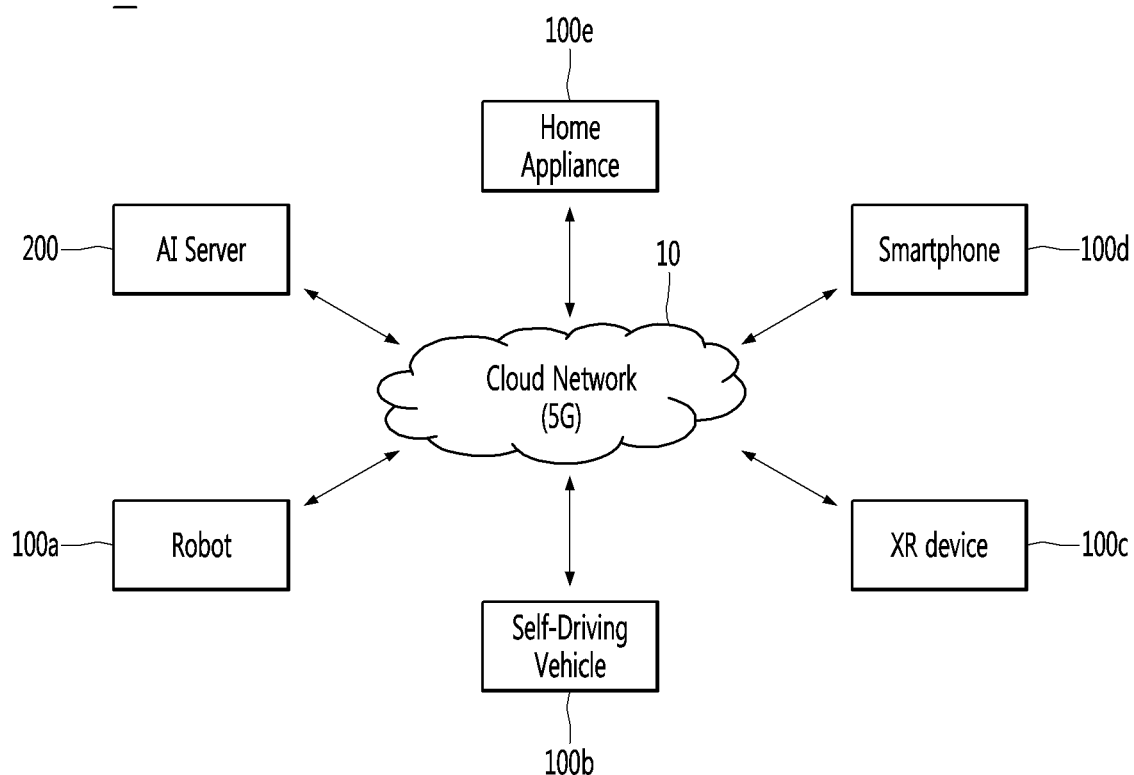
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
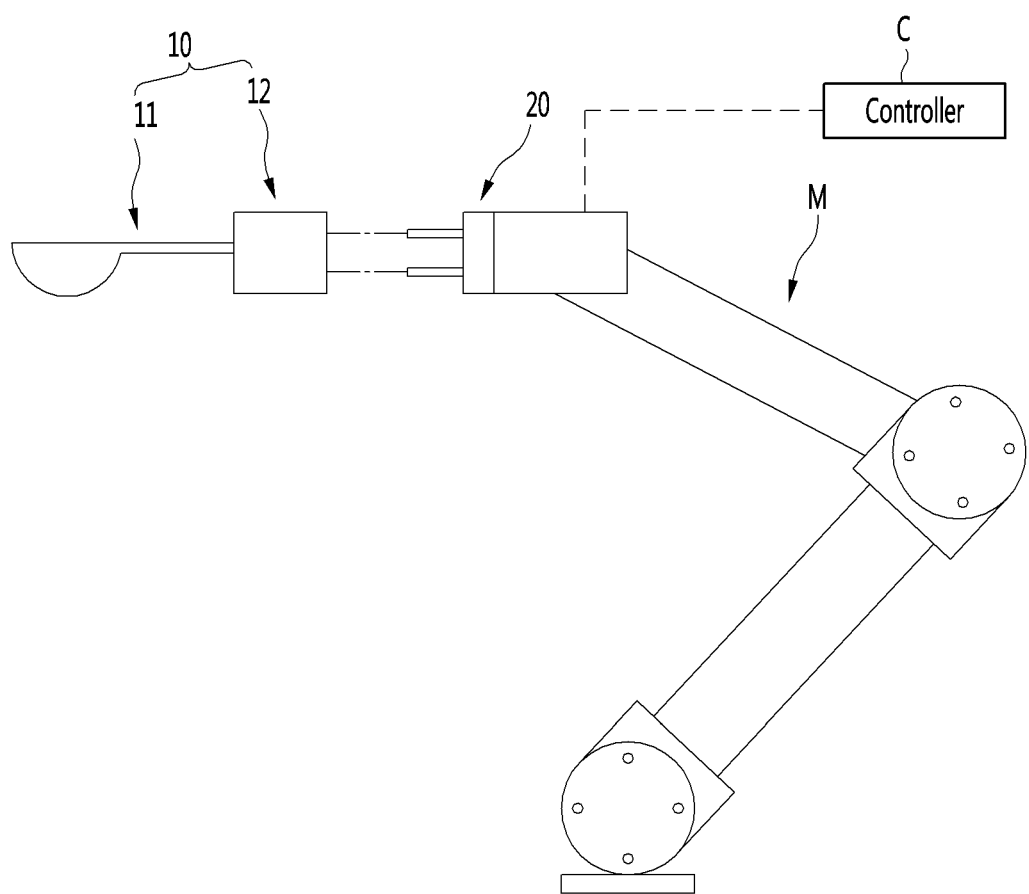
FIG. 4 is a schematic diagram of a tool change system according to an embodiment of the present disclosure.
Figure 5:
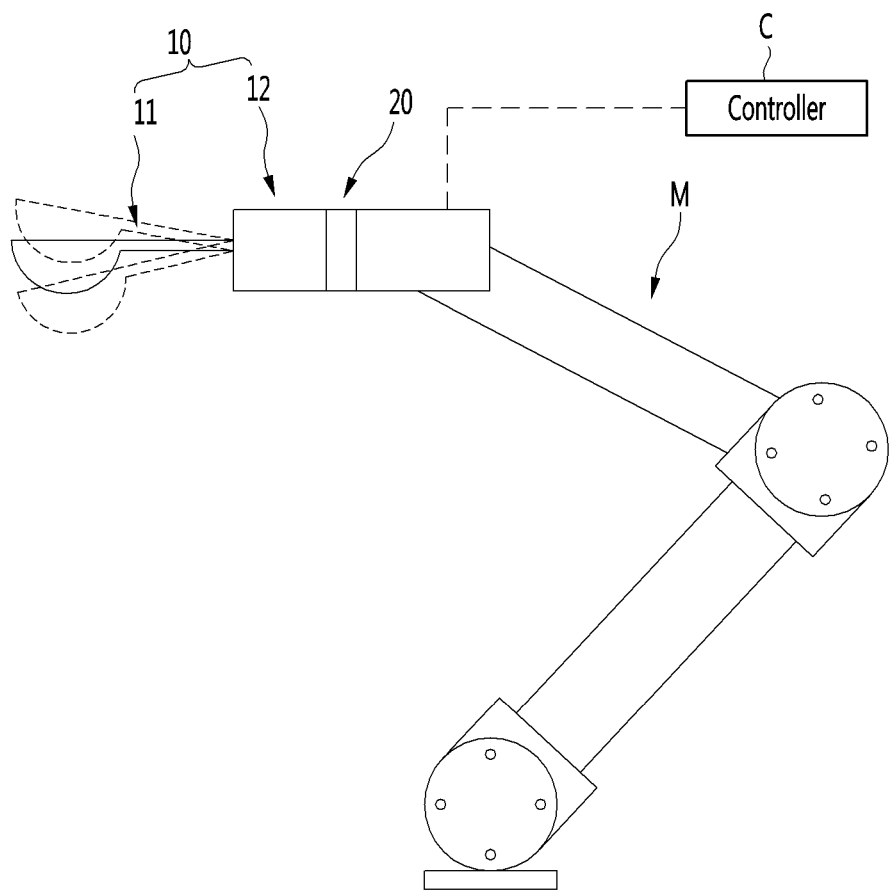
FIG. 5 is a view for explaining an action of a tool change system illustrated in FIG. 4.

FIG. 4 is a schematic diagram of a tool change system according to an embodiment of the present disclosure, and FIG. 5 is a view for explaining an action of a tool change system illustrated in FIG. 4.

The tool change system according to an embodiment of the present disclosure may include a tool 10 and a tool changer 20. The tool change system may further include a controller C.

The tool 10 may include a tool body 11 and a coupler 12.

The tool body 11 may be a tool required for a task performed by a manipulator M. For example, the tool 10 may be any one among a spoon, a ladle and a spatula.

The coupler 12 is configured to be selectively fastened to the tool changer 20. The coupler 12 may be fastened to detachable from the tool body 11. The coupler 12 may be provided apart from the tool body 11. Therefore, the coupler 12 may be used by interconverting different types of tool bodies 11.

The tool changer 20 may be selectively fastened to the tool 10, more particularly, the coupler 12. That is, the tool 10 may be coupled to the tool changer 20 by the coupler 12, and the manipulator M may perform a task that uses the tool 10.

The tool changer 20 may be included in the manipulator M. In more detail, the tool changer 20 may be included in an end of the manipulator M.

The manipulator M may be a component included in the robot 100a described above. The manipulator M may include a plurality of arms and a plurality of actuators configure to operate the plurality of arms. The configuration and the kind of the manipulator M are not limited.

In addition, the tool changer 20 may separate the tool 10 from a tool mounter (not shown), or may install the tool 10 in the tool mounter. The tool changer 20 may select and use a necessary tool 10 from different types of tools 10 installed in a number of tool mounters. That is, the tool changer 20 may change the tool 10 which the manipulator M can use.

Meanwhile, the controller C may control an overall motion of the tool change system. In more detail, the controller C may open or close a switch S (see FIG. 6) of the tool changer 20 which will be described below. To that end, the tool 10 may be fastened to or separated from the tool changer 20. In addition, the controller C may open or close the switch S according to a preset frequency. To that end, the tool 10 may vibrate to shake off residues remaining on a surface of the tool body 11. The contents thereon will be described in detail below.

In addition, the controller C can certainly control an operation of the manipulator M. In more detail, the controller C may control the manipulator M such that the tool changer 20 approaches and is fastened to the coupler 12 of the tool 10 installed in the mounter (not shown). In addition, the controller C may perform a task (for example, cooking) that uses the tool body 11 in a state that the tool 10 is fastened to the tool changer 20. In addition, the controller C may install, in the mounter (not shown), the tool 10 that has been used, and may control the manipulator M such that the tool changer 20 is separated from the coupler 12.

Figure 6:
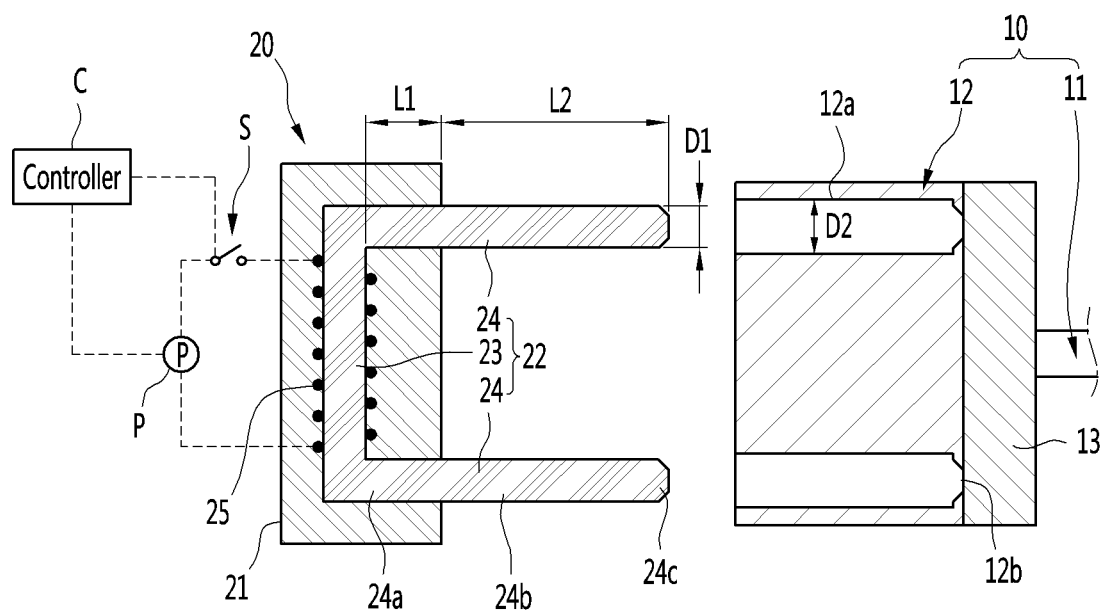
FIG. 6 is a view for explaining a detailed configuration of the tool change system according to one embodiment of the present disclosure.
Figure 7:
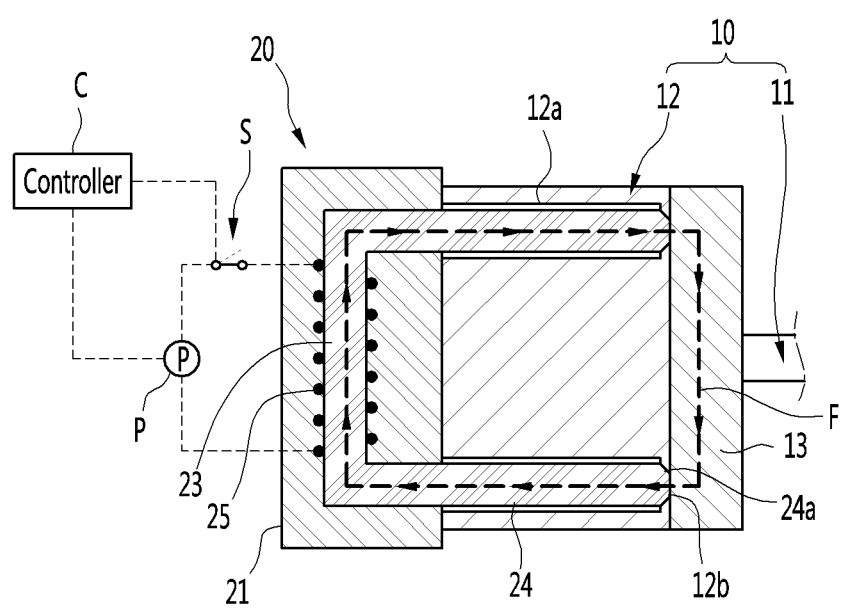
FIG. 7 is a view for explaining a fastening of the tool changer and the tool illustrated in FIG. 6.

FIG. 6 is a view for explaining a detailed configuration of the tool change system according to one embodiment of the present disclosure, and FIG. 7 is a view for explaining a fastening of the tool changer and the tool illustrated in FIG. 6.

The tool changer 20 according to this embodiment may include a housing 21, an electromagnetic core 22 and a coil 25.

The housing 21 may form an appearance of the tool changer 20. The housing 21 may include one surface facing an adapter 12, the other surface disposed on an opposite side of the one surface, and a circumferential surface through which the one surface and the other surface are connected to each other.

The housing 21 may be a non-magnetic material. The housing 21 may be fixed to the manipulator M (see FIGS. 4 and 5). Preferably, the other surface of the housing 21 may be fixed to the manipulator M.

The electromagnetic core 22 may be a magnetic material. As an example, the electromagnetic core 22 may include a steel material. If the current flows on a coil 25 that will be described below, the electromagnetic core 22 may create a magnetic field, the tool changer 20 and the coupler 12 are fastened to each other by the magnetic field. Since the principle of an electromagnet is a well-known technique, its detailed explanation will be omitted.

The electromagnetic core 22 may include an inner core 23 embedded in the housing 21, and a pair of connecting cores 24 protruding from the housing 21.

The inner core 23 may be elongated in one direction within the housing 21. Preferably, the inner core 23 may be elongated in a radial direction of the housing 21.

The connecting core 24 may protrude from the housing 21 to the tool 10. In more detail, the connecting core 24 may protrude from the one surface of the housing 21 to an adapter 12. The connecting core 24 may be inserted into a connecting groove 12a of the tool 10.

A pair of connecting cores 24 may be connected to both ends of the inner core 23, respectively. The pair of connecting cores 24 and the inner core 23 may be integral. The connecting core 24 and the inner core 23 may be perpendicular to each other. The connecting core 24 may be bent at an end of the inner core 23.

The connecting core 24 may protrude in a horizontal direction from the housing 21, or may slopingly protrude in a direction that as the connecting core 24 moves away from the housing 21, a height thereof gets higher. Therefore, the tool 10 may be caught in the connecting core 24 with respect to an action direction of gravity. To that end, since the magnetic field is not created in the connecting core 24 in the state that the connecting core 24 is inserted into the connecting groove 12a of the tool 10, although the tool 10 and the tool changer 20 are separated from each other, the tool 10 may not be detached from the tool changer 20.

A cross-section area of the connecting core 24 may be smaller than an inner cross-section area of the connecting groove 12a of the tool 10. As an example, an outer diameter D1 of the connecting core 24 may be smaller than an inner diameter D2 of the connecting groove 12a. Therefore, an opening may be formed between an outer circumference of the connecting core 24 and an inner circumference of the connecting groove 12a, and the tool 10 may be easily vibrated relative to the tool changer 20. The contents thereon will be described in detail below.

In addition, the connecting core 24 may include an inner part 24a disposed in the housing 21, and an outer part 24b disposed outside the housing 21.

The inner part 24a may be connected to an end of the inner core 23. The inner part 24a may have a first length L1.

The outer part 24b may extend from the inner part 24a. The outer part 24b may be disposed outside the housing 21. At least part of the outer part 24b may be inserted into the connecting groove 12a of the tool 10.

The outer part 24b may have a second length L2 longer than the first length L1 of the inner part 24a. That is, the connecting core 24 may protrude long enough from the housing 21, and the tool 10 may be stably caught in the connecting core 24. To that end, though the magnetic field is not created in the connecting core 24 in the state that the connecting core 24 is inserted into the connecting groove 12a of the tool 10, the tool 10 may not be separated from the tool changer 20.

A taper 24c may be formed on an outer end of the connecting core 24. That is, the taper 24c may be formed on an end of the outer part 24b. As the taper 24c moves away from the housing 21, the taper 24c may be slopingly formed in a direction that a diameter of the connecting core 24 gets smaller.

Meanwhile, the coil 25 may be wound around the electromagnetic core 22, more specifically, the inner core 23. The coil 25 may wound around the inner core 23 several times. The current may be applied to the coil 25. If the current is applied to the coil 25, the electromagnetic core 22 may create a magnetic field.

The tool changer 20 may further comprise a current circuit having power P and a switch S. In addition, the current circuit may further comprise at least one amplifier (not shown) and resistance (not shown). The power P and the switch S are preferably disposed outside the housing 31.

The power P may supply the current applied to the coil 25. The power P may be controlled to be on or off by the controller C. However, the present disclosure is not limited thereto, and the power P may be maintained in an on-state all the times.

The switch S may regulate the current applied to the coil 25. The controller C may be electrically connected to the switch S, and control the switch S. In more detail, the controller C may open or close the switch S.

If the switch S is closed, the current is applied to the coil 25, and the magnetic field is derived to the electromagnetic core 22. Therefore, the tool 10 and the tool changer 20 may be fastened to each other by the magnetic field created in the electromagnetic coil 22.

On the contrary, if the switch S is opened, the current is not applied to the coil 25, and the magnetic field is not derived to the electromagnetic coil 22. Therefore, the tool 10 and the tool changer 20 may be separated from each other.

In addition, the controller C may repetitively open or close the switch S according to the preset frequency. Therefore, the tool 10 may be repetitively fastened to and separated from each other, and in this process, the tool 10 may be vibrated. To that end, in a process of performing a task by the tool body 11, the residues remaining on the surface of the tool body 11 may be shaken off by inertia.

In addition, the set frequency according to which the controller C opens or closes the switch S is consistent with the resonance frequency of the tool 10. Therefore, an amplitude of vibrating the tool 10 may be sufficiently increased, and the residues remaining on the surface of the tool body 11 may be reliably shaken off.

Meanwhile as described above, the tool 10 may include the tool body 11 and the coupler 12.

The coupler 12 include one surface facing the tool changer 20, the other surface disposed on an opposite side of the one surface, and a circumferential surface through which the one surface and the other surface are connected to each other.

The connecting groove 12a into which the connecting core 24 of the tool changer 20 is inserted may be formed in the coupler 12. The outer part 24b of the connecting core 24 may be inserted in the connecting groove 12a. The connecting groove 12a may be depressed on the one surface of the coupler 12.

A pair of connecting grooves 12a spaced apart from each other may be provided. The pair of connecting cores 24 may be inserted into the pair of connecting grooves 12a, respectively.

A depressed length of the connecting groove 12a may correspond to a length of the outer part 24b. That is, the depressed length of the connecting groove 12a may be equal or similar to the second length L2.

A direction of depressing the connecting groove 12a may correspond to a direction of protruding the connecting core 24. As an example, the connecting core 24 may protrude long in the horizontal direction from the housing 21, and the connecting groove 12a may be depressed in the horizontal direction. As another example, the connecting core 24 may slopingly protrude in a direction that as the connecting core 24 moves away from the housing 21, a height thereof gets higher, and the connecting groove 12a may be slopingly depressed in the direction that as the connecting groove 12a moves away from the housing 21, a height thereof gets higher.

In addition, as described above, the inner cross-section area of the connecting groove 12a may be larger than the cross-section area of the connecting core 24. As an example, the inner diameter of the connecting groove 12a may be larger than the outer diameter of the connecting core 24.

A taper groove 12b corresponding to the taper 24c of the connecting core 24 may be formed on an inner end of the connecting groove 12a. The taper groove 12b may be stepped with the inner circumference of the connecting groove 12a. As the taper groove 12b moves in a depth direction of the connecting groove 12a, the taper groove 12b may be slopingly formed in a direction that an inner diameter thereof gets smaller.

The taper 24c of the connecting core 24 may be fitted in the taper groove 12b. Therefore, when the manipulator M performs the task in the state that the tool 10 and the tool changer 20 are fastened to each other by the magnetic force, shaking the tool 10 relative the tool changer 20 may be minimized. That is, action responsiveness of the tool 10 may be improved.

The coupler 12 may include a magnetic body 13. The magnetic body 13 may be a magnetic material. As an example, the magnetic body 13 may be a steel material. As another example, the magnetic body 13 may be a permanent magnet.

Hereinafter, a case will be described by way of example in which part of the coupler 12 is the magnetic body 13 being the magnetic material. However, the present disclosure is not limited thereto, and the whole of the coupler 12 can be composed of the magnetic body 13.

The magnetic body 13 preferably connects the pair of connecting grooves 12a. In more detail, the inner ends of each of the connecting grooves 12a may be connected to the magnetic body 13. To that end, the magnetic body 13 may form a magnetic-flux loop F along with the electromagnetic core 22. The magnetic-flux loop F may mean a path of a magnetic flux formed along the magnetic body 13 and the electromagnetic core 22. The magnetic-flux loop F may be a closed loop.

The magnetic-flux loop F may pass from one end of the inner core 23 to one connecting core 24, the magnetic body 13 and the other connecting core 24 in sequence, and lead to the other end of the inner core 23. In addition, the magnetic-flux loop F may lead from the other end of the inner core 23 to the one end thereof, thus leading to the inside of the inner core 23.

To that end, the tool 100 may be reliably fastened to the tool changer 20 by the magnetic force. The magnetic force may be exerted by a binding force relative to an axial direction (for example, a horizontal direction) of the tool changer 20.

Hereinafter, the action of the tool change system according to this embodiment will be described.

The controller C may control the manipulator M such that the connecting core 24 of the tool changer 20 is inserted into the connecting groove 12a of the tool 10. At this time, the tool 10 may be caught in the mounter (not shown).

If the connecting core 24 is inserted into the connecting groove 12a, the controller C may close the switch S. If the switch S is closed, the current supplied from the power P may be applied to the coil 25 and the magnetic field may be derived to the electromagnet core 22.

However, the present disclosure is not limited thereto, and after closing the switch S, the controller C can control the manipulator M such that the connecting core 24 of the tool changer 20 is inserted into the connecting groove 12a of the tool 10.

If the connecting core 24 is in a state of an insertion into the connecting groove 12a and the current is applied to the coil, as described above, the electromagnet core 22 and the magnetic body 13 may form the magnetic-flux loop F together. Therefore, the tool 10 and the tool changer 20 may be fastened to each other by the magnetic force. In more detail, the taper 24c of the connecting core 24 may be fitted in the taper groove 12b of the connecting groove 12a. In addition, the outer circumference of the connecting core 24 and the inner circumference of the connecting groove 12*a* may be spaced part from each other to form an opening.

In the state that the tool 10 and the tool changer 20 are fastened to each other by the magnetic force, the controller C may control the manipulator M to perform a predetermined task process (for example, cooking) that uses the tool body 11.

In the middle of the task process, the residues (for example, soup) may remain on the surface of the tool body 11. Therefore, by vibrating the tool body 11 before the tool 10 is caught back in the mounter (not shown), the residues may be shaken off the tool body 11.

In addition, the task process may include a step of shaking the tool body. As an example, the tool body 11 may include a mesh in which food and drink are put, and moisture or oil of food and drink may be removed by vibrating the tool body 11.

In order to vibrate the tool body 11, the controller C may repetitively open or close the switch S according to the set frequency. The set frequency is preferably consistent to the resonance frequency of the tool body 11.

In more detail, if the switch S is opened, the current is not applied to the coil 25 and the tool changer 20 and the tool 10 may be separated from each other. Therefore, the taper groove 12*b* and the taper 24*c* of the connecting core 24 which have been fitted together may be separated from each other. On the contrary, if the switch S is closed, the current is applied to the coil 25, the tool changer 20 and the tool 10 may be fastened to each other. Therefore, the taper groove 12*b* and the taper 24*c* of the connecting core 24 which have been separated from each other may be fitted together.

In addition, the controller C may repetitively open or close the switch S according to the set frequency in a state that the connecting core 24 of the tool changer 20 is horizontal, or as the connecting core 24 moves away from the housing 21, it is sloping in a direction that a height thereof gets higher. To that end, when the switch S is opened and the current is not applied to the coil 25, the tool 10 may be prevented from falling by gravity.

Therefore, the tool 10 may not be detached from the tool changer 20, may be repetitively fastened to/separated from the tool changer 20, and may be vibrated.

The controller may vibrate the tool 10 during a predetermined time. Thereafter, the controller C may catch the tool 10 in the mounter (not shown), and may control the manipulator M such that the connecting core 24 of the tool changer 20 is detached from the connecting groove 12*a* of the tool 10.

Figure 8:
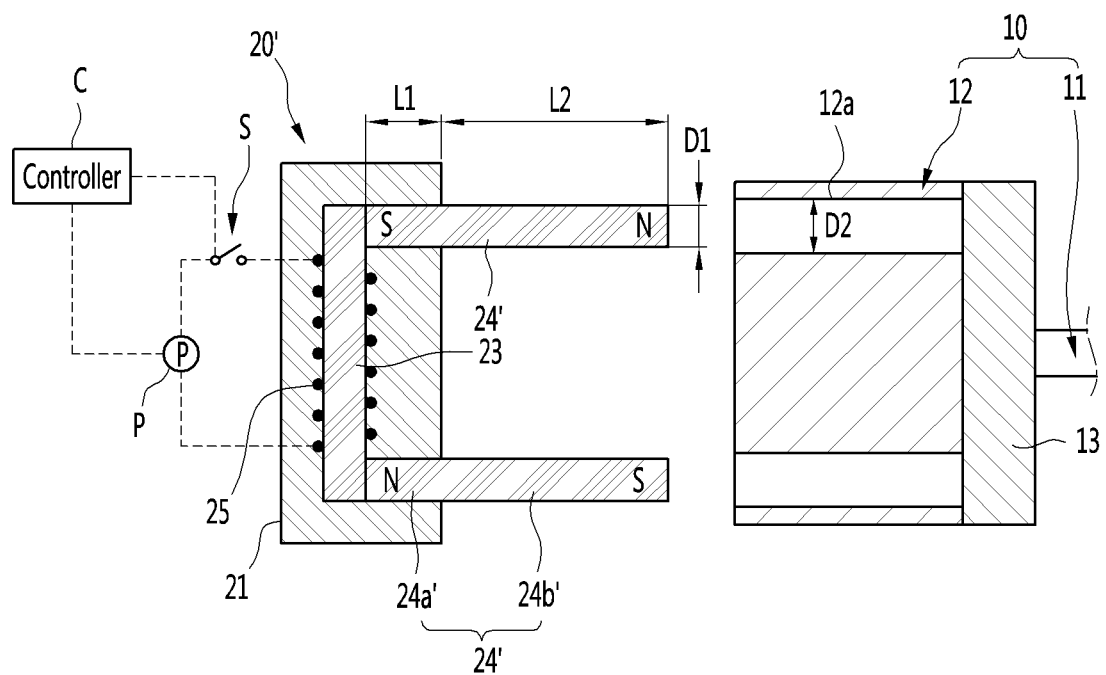
FIG. 8 is a view for explaining a detailed configuration of the tool change system according to another embodiment of the present disclosure.
Figure 9:
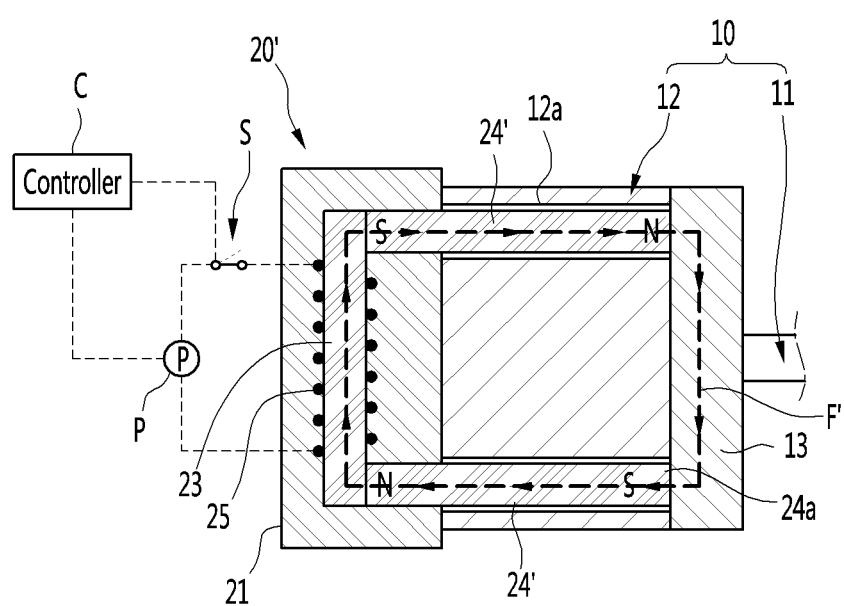
FIG. 9 is a view for explaining a fastening of the tool changer and the tool illustrated in FIG. 8.

FIG. 8 is a view for explaining a detailed configuration of the tool change system according to another embodiment of the present disclosure, and FIG. 9 is a view for explaining a fastening of the tool changer and the tool illustrated in FIG. 8.

Hereinafter, the descriptions overlapping with one embodiment described above will be omitted and the differences therefrom will be described.

A tool changer 20' according to this embodiment may include a magnet 24' instead of the connecting core 24 (see FIGS. 6 and 7) described above.

The magnet 24' may protrude from the housing 21 to the tool 10. In more detail, the magnet 24' may protrude from the one surface of the housing 21 to the adapter 12. The magnet 24' may be coupled to the tool 10. In more detail, the magnet 24' may be inserted into the connecting groove 12*a* of the tool 10.

A pair of magnets 24' may be connected to both ends of the inner corner 23, respectively. The pair of magnets 24' and the inner core 23 may be manufactured separately. The magnet 24' and the inner core 23 may be perpendicular to each other.

The magnet 24' may protrude in the horizontal direction from the housing 21, or may slopingly protrude in a direction that as the magnet 24' moves away from the housing 21, a height thereof gets higher. Therefore, the tool 10 may be caught in the magnet 24' with respect to the action direction of gravity. To that end, though a magnetic field of the magnet 24' is weakened in a state that the magnet 24' is inserted into the connecting groove 12*a* of the tool 10, the tool 10 may not be detached from the tool changer 20.

A cross-section area of the magnet 24' may be smaller than an inner cross-section area of the connecting groove 12*a* of the tool 10. As an example, an outer diameter D1 of the magnet 24' may be smaller than an inner diameter D2 of the connecting groove 12*a*. Therefore, an opening may be formed between an outer circumference of the magnet 24' and the inner circumference of the connecting groove 12*a*, and the tool 10 may be easily vibrated relative to the tool changer 20.

The magnet 24' may include an inner part 24*a'* disposed in the housing 21, and an outer part 24'*b* disposed outside the housing 21.

The inner part 24*a'* may be connected to the end of the inner core 23. The inner part 24*a'* may have a first length L1.

The outer part 24*b'* may extend from the inner part 24*a'*. The outer part 24*b'* may be disposed outside the housing 21. At least part of the outer part 24*b'* may be inserted into the connecting groove 12*a* of the tool 10.

The outer part 24*b'* may have a second length L2 longer than the first length L1 of the inner part 24*a'*. That is, the magnet 24' may protrude long enough from the housing 21, and the tool 10 may be stably caught in the magnet 24'. To that end, though the magnetic field of the magnet 24' is weakened in the state that the magnet 24' is inserted into the connecting groove 12*a* of the tool 10, the tool 10 may not be separated from the tool changer 20.

Since the magnet 24' forms a permanent magnetic field, though the current is not applied to the current, the tool 10 may be fastened in the tool changer 20' by the magnetic force of the magnet 24'. However, the magnetic field of the magnet 24' may be strengthened by the magnetic field that is derived to the inner core 23 by applying the current to the coil 25. That is, a binding force between the tool 10 and the tool changer 20 may be adjusted.

Poles of a pairs of magnets 24' may be arranged opposite of each other.

In more detail, S pole of one magnet of the pair of magnets 24' may be in contact with the inner core 23, and N pole of the one magnet may protrude outside of the housing 21. N pole of the other magnet of the pair of magnets 24' may be in contact with the inner core 23, and S pole of the other magnet may protrude outside of the housing 21.

Hereinafter, for convenience of explanation, the one magnet is named a first magnet, and the other magnet is named a second magnet. In addition, among both ends of the inner core 23, an end connected to the first magnet is named a first end, and an end connected to the second magnet is named a second end.

Therefore, the magnetic body 13 of the tool 10 may form a magnetic-flux loop F' along with the pair of magnets 24' and the inner core 23. The magnetic-flux loop F' may mean a path of a magnetic flux formed along the magnetic body 13, the pair of magnets 24' and the inner core 23. The magnetic-flux loop F' may be a closed loop.

The magnetic-flux loop F' may pass from the first end of the inner core 23 to the first magnet 24', the magnetic body 13 and the second magnet 24' in sequence, and lead to the second end of the inner core 23. In addition, the magnetic-flux loop F' may lead from the second end of the inner core 23 to the first end thereof, thus leading to the inside of the inner core 23.

When the current is applied to the coil 25, the magnetic field derived to the inner core 23 may be a direction of strengthening the magnetic field of the magnet 24'. In more detail, when the current is applied to the coil 25, the magnetic field derived in the inner core 23 may face from the second end to the first end among both ends of the inner core 23.

To that end, a derived magnetic field applied to the coil 25 and the permanent magnetic field of the magnet 24' may overlap with each other, and the binding force between the tool 10 and the tool changer 20 may be strengthened.

Hereinafter, the action of the tool change system according to this embodiment will be described.

The controller C may control the manipulator M such that the magnet 24' of the tool changer 20 is inserted into the connecting groove 12a of the tool 10. At this time, the tool 10 may be caught in the mounter (not shown).

If the magnet 24' is inserted into the connecting groove 12a, the inner core 23, the pair of magnets 24' and the magnetic body 13 may constitute the magnetic-flux loop F' together by the permanent magnetic field of the magnet. Therefore, the tool 10 and the tool changer 20 may be fastened to each other by the magnetic force.

If the magnet 24' is inserted into the connecting groove 12a, the controller C may close the switch S. If the switch S is closed, the current supplied from the power P may be applied to the coil 25, and the magnetic field may be derived along a direction of the magnetic-flux loop F' in the inner core 23. Therefore, a magnetic flux density of the magnetic-flux loop F' may be increased, and the magnetic force between the tool 10 and the tool changer 20 may be strengthened. That is, the tool 10 may be more firmly fastened to the tool changer 20.

However, the present disclosure is not limited, and after closing the switch S, the controller C can control the manipulator M such that the magnet 24' of the tool changer 20 is inserted into the connecting groove 12a of the tool 10.

In a state that the tool 10 and the tool changer 20 are fastened to each other by the strengthened magnetic force, the controller C may control the manipulator M to perform a predetermined task process (for example, cooking) that uses the tool body 11.

In order to vibrate the tool body 11, the controller C may repetitively open or close the switch S according to the set frequency. The set frequency is preferably consistent to the resonance frequency of the tool body 11.

In more detail, if the switch S is opened, the current is not applied to the coil 25 and the magnetic force of the magnet 24' is not strengthened. Therefore, the tool changer 20 and the tool 10 may be fastened to each other by a relatively weak magnetic force. On the contrary, if the switch S is closed, the current is not applied to the coil 25 and the magnetic force of the magnet 24' may be strengthened. Therefore, the tool changer 20 and the tool 10 may be fastened to each other by a relatively strong magnetic force.

Therefore, the tool 10 may not be detached from the tool changer 20, the binding force of the tool 10 with the tool changer 20 may be relatively changed, and the tool 10 may be vibrated.

The controller may vibrate the tool 10 during the predetermined time. Thereafter, the controller C may catch the tool 10 in the mounter (not shown), and may control the manipulator M such that the magnet 24' of the tool changer 20 is detached from the connecting groove 12a of the tool 10.

According to a preferred embodiment of the present disclosure, if the current is applied to the coil, a magnetic field may be derived to the inner core and the connecting core. Therefore, the tool and the tool changer may be rapidly and simply fastened by the magnetic field, and the tool changer can be made compact.

In addition, since the switch configured to regulate the current applied to the coil is opened or closed according to the set frequency, the tool and tool changer may be repetitively fastened and separated, and the tool may be vibrated relative to the tool changer. Therefore, residues remaining on a surface of the tool body may be shaken off, or a shaking-off task of the tool body may be performed.

In addition, the set frequency may be consistent with the resonance frequency of the tool. Therefore, an amplitude of vibrating the tool body may be sufficiently increased.

In addition, the cross-section areas of the connecting core/the magnet may be smaller than the inner cross-section area of the connecting groove. Therefore, an opening may be formed between an outer circumference of the connecting core or the magnet and an inner circumference of the connecting groove, and the tool may be easily vibrated relative to the tool changer.

In addition, the connecting core/magnet may protrude in a horizontal direction from the housing, or slopingly protrude in a direction that as the connecting core moves away from the housing, a height thereof gets higher. Therefore, if the magnetic force is not exerted between the tool and the tool changer or the magnetic force is not sufficiently strong, the tool may not be detached from the tool changer.

In addition, the outer part of the connecting core/magnet may be longer than the inner part thereof. Therefore, the tool may be stably caught in the connecting core/magnet.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A tool changer for a manipulator of a robot, the tool changer comprising:
    a housing;
    an inner core located in the housing, the inner core having a first end and a second end;
    a coil wound around the inner core;
    a pair of extension members connected to the first and second ends of the inner core, each extension member protruding from the housing toward a tool to be insertable into a corresponding connecting groove of the tool, wherein the pair of extension members and the inner core are provided as a monolithic body;

a power source to supply a current to the coil;

a switch configured to regulate the current supplied to the coil; and a controller configured to open or close the switch according to a predetermined frequency.

2. The tool changer according to claim 1, wherein the pair of extension members and the inner core are formed of a magnetizable material.

3. The tool changer according to claim 2, wherein a cross-sectional area of each extension member is configured to be smaller than an inner cross-sectional area of the corresponding connecting groove.

4. The tool changer according to claim 2, wherein each extension member protrudes in a horizontal direction from the housing or protrudes at a non-zero angle such that, as the extension member extends away from the housing, a height thereof increases.

5. The tool changer according to claim 2, wherein each extension member comprises:

an inner part disposed in the housing, the inner part having a first length; and an outer part extending from the inner part outside of the housing, the outer part having a second length that is longer than the first length.

6. The tool changer according to claim 1, wherein the predetermined frequency is adjustable to correspond to a resonance frequency of the tool.

7. A tool changer for a manipulator of a robot, the tool changer comprising:

a housing;

an inner core located in the housing, the inner core having a first end and a second end;

a coil wound around the inner core;

a pair of extension members connected to the first and second ends of the inner core, each extension member protruding from the housing toward a tool to be insertable into a corresponding connecting groove of the tool, wherein the pair of extension members is a pair of magnets;

a power source to supply a current to the coil;

a switch configured to regulate the current supplied to the coil; and a controller configured to open or close the switch according to a predetermined frequency.

8. The tool changer according to claim 7, wherein an S pole of a first magnet of the pair of magnets is in contact with the inner core and an N pole of the first magnet protrudes outside of the housing, and wherein an N pole of a second magnet of the pair of magnets is in contact with the inner core and an S pole of the second magnet protrudes outside of the housing.

9. The tool changer according to claim 7, wherein a cross-sectional area of each magnet is configured to be smaller than an inner cross-sectional area of the corresponding connecting groove.

10. The tool changer according to claim 7, wherein each magnet protrudes in a horizontal direction from the housing or protrudes at a non-zero angle such that, as the extension member extends away from the housing, a height thereof increases.

11. The tool changer according to claim 7, wherein each magnet comprises:

an inner part disposed in the housing, the inner part having a first length; and an outer part extending from the inner part outside of the housing, the outer part having a second length that is longer than the first length.

12. A tool change system, comprising:

a tool, the tool including:

a tool body; and a coupler connected to the tool body, the coupler including a pair of connecting grooves; and a tool changer for a manipulator of a robot, the tool changer including:

a housing;

an inner core located in the housing, the inner core having a first end and a second end;

a coil wound around the inner core;

a pair of extension members connected to the first and second ends of the inner core, each extension member protruding from the housing, the pair of extension members being configured to be received in the pair of connecting grooves in the coupler, wherein the pair of extension members is a pair of magnets;

a power source to supply a current to the coil;

a switch configured to regulate the current supplied to the coil; and a controller configured to open or close the switch according to a predetermined frequency.

13. The tool change system according to claim 12, wherein the coupler includes a magnetic body on which magnetic force is exerted to connect the coupler to the tool changer, the magnetic body being located between the tool body and the pair of connecting grooves.

14. The tool change system according to claim 12, wherein a cross-sectional area of each extension member is configured to be smaller than an inner cross-sectional area of the corresponding connecting groove.

15. The tool change system according to claim 12, wherein each extension member protrudes in a horizontal direction from the housing or protrudes at a non-zero angle such that, as the extension member extends away from the housing, a height thereof increases.

16. The tool change system according to claim 12, wherein each extension member comprises:

an inner part disposed in the housing, the inner part having a first length; and an outer part extending from the inner part outside of the housing, the outer part having a second length that is longer than the first length.

17. The tool change system according to claim 12, wherein an S pole of a first magnet of the pair of magnets is in contact with the inner core and an N pole of the first magnet protrudes outside of the housing, and wherein an N pole of a second magnet of the pair of magnets is in contact with the inner core and an S pole of the second magnet protrudes outside of the housing.

18. The tool change system according to claim 12, wherein the predetermined frequency is adjustable to correspond to a resonance frequency of the tool.

* * * * *